US006387385B1

United States Patent
Wang

(10) Patent No.: US 6,387,385 B1
(45) Date of Patent: May 14, 2002

(54) PROCESS TO PREPARE MICROENCAPSULATED FORMULATIONS

(75) Inventor: Wenhua W. Wang, Levittown, PA (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/437,938

(22) Filed: Nov. 10, 1999

Related U.S. Application Data

(60) Provisional application No. 60/108,189, filed on Nov. 12, 1998.

(51) Int. Cl.$^7$ .................................................. A01N 25/28
(52) U.S. Cl. ........................ 424/408; 424/409; 424/417; 427/213.31
(58) Field of Search ................................ 424/408, 409, 424/417; 427/212, 213.3, 213.31, 213.32, 213.33, 214, 220, 221

(56) References Cited

U.S. PATENT DOCUMENTS

| | | | |
|---|---|---|---|
| 3,069,370 A | 12/1962 | Jensen et al. | |
| 3,854,981 A | 12/1974 | Schon et al. | ................ 117/62.1 |
| 3,884,871 A | 5/1975 | Herman et al. | .......... 260/42.14 |
| 4,087,376 A | 5/1978 | Foris et al. | ................. 252/316 |
| 4,824,823 A * | 4/1989 | Pietszh et al. | ............... 503/201 |
| 5,302,654 A * | 4/1994 | Ishil et al. | ................... 524/458 |
| 5,462,915 A | 10/1995 | Curtis et al. | ................. 504/323 |
| 5,576,008 A | 11/1996 | Yang et al. | ................. 424/408 |
| 5,576,009 A | 11/1996 | Nastke et al. | ................ 424/408 |
| 5,662,916 A | 9/1997 | Nastke et al. | ................ 424/408 |
| 5,674,519 A | 10/1997 | Curtis et al. | ................. 424/408 |
| 6,022,501 A * | 2/2000 | Dexter et al. | ................. 264/4.7 |

FOREIGN PATENT DOCUMENTS

| | | |
|---|---|---|
| EP | 0517669 B | 6/1992 |
| EP | 0492793 A1 | 7/1992 |
| EP | 0551796 * | 7/1993 |
| EP | 0611253 A | 2/1994 |
| EP | 0706821 A | 4/1996 |
| EP | 0792682 A1 | 9/1997 |
| GB | 930421 | 7/1963 |
| WO | WO 88/08300 | 11/1988 |
| WO | WO91/04661 A2 | 4/1991 |
| WO | WO 94/22302 | 10/1994 |
| WO | WO 94/22303 | 10/1994 |
| WO | WO 97/03657 | 2/1997 |
| WO | WO 97/07676 | 3/1997 |
| WO | WO 97/13815 | 4/1997 |

* cited by examiner

Primary Examiner—Neil S. Levy
(74) Attorney, Agent, or Firm—FMC Corporation

(57) ABSTRACT

Provided is a method of encapsulating a chemical agent comprising: (a) combining particles of a chemical agent and an encapsulation effective amount of a first encapsulating agent in an aqueous solvent and (b), converting the first encapsulating agent to a polymer to form encapsulated particles of the chemical agent.

4 Claims, No Drawings

PROCESS TO PREPARE MICROENCAPSULATED FORMULATIONS

This application claims benefit of U.S. Provisional Application No. 60/108,189, filed Nov. 12, 1998.

The present invention relates to improved formulations of solid chemical agents. In particular, the invention relates to encapsulated or capsule suspension (CS) formulations of particles of solid chemical agent compositions, such as pesticides, and more particularly it pertains to the coating of solid particles with polymer film(s) in an aqueous environment.

It is known that solid materials can be microencapsulated by solvent evaporation, solvent extraction, coacervation, in-situ polymerization, and spray-drying. However, these microencapsulation processes tend to involve either the use of organic solvents which are often toxic or hazardous to either the environment or the personnel involved, or the processes are complicated and difficult to apply on a commercial scale. As a result, there are but a few methods by which solid insoluble chemical agents can be safely and efficiently microencapsulated.

The present invention provides encapsulating techniques that are water-based and hence economical and environmentally friendly. By avoiding organic solvents, the costs and dangers of recycling such materials are avoided. The method can be conducted in relatively simple equipment using relatively simple process steps.

A surprising observation is that encapsulation can be conducted with an encapsulating agent that can be transformed into an insoluble form and which, in the insoluble form, can coat the solid material. Further, the process of encapsulation can unexpectedly be conducted in an aqueous suspension without agglomerating the particles of solid material.

SUMMARY OF THE INVENTION

The present invention relates to encapsulated or capsule suspension (CS) formulations of chemical agents that are coated with a first encapsulating agent and then optionally double-coated with a second encapsulating agent. The particles of the encapsulated formulation preferably have a particle size from about 1 $\mu$m to about 100 $\mu$m; more preferably from about 1 $\mu$m to about 30 $\mu$m. The compositions of the present invention are of the type commonly referred to by skilled artesians as microencapsulated.

The present invention also relates to methods for preparing the formulations of chemical agents. The method of the invention involves encapsulation of chemical agents according to the following steps: (a) providing a dispersion or suspension, in an aqueous solvent, of particles of a chemical agent (such as a bioactive agent), a water-soluble or water dispersible first encapsulating agent, which also has wetting agent characteristics, and optionally an antifoam agent; (b) converting the first encapsulating agent to an encapsulating polymer that coagulates or precipitates from the aqueous solvent on and around the particles of the chemical agent, thereby forming encapsulated particles of the chemical agent.

In preferred embodiments, the encapsulated particles remain in suspension. The process can involve a step (c) of reacting the precipitated encapsulating polymer with a first curing agent. Certain embodiments involve the further steps of (d) optionally agitating the dispersion while adding to it, either neat or in an aqueous solution or dispersion, a second encapsulating agent and; (e) optionally curing the second encapsulating agent by raising the temperature. In one embodiment, all of the above steps are carried out with the particles suspended in the aqueous solvent.

The process has two particularly preferred embodiments. Where the first encapsulating agent is a polymer, the converting step (b) comprises changing the pH of the aqueous solvent to precipitate the polymer. Where the first encapsulating agent comprises dispersible oligomers or dispersible polymers, the converting step (b) comprises forming the precipitated polymer from the first encapsulating agent.

In one particular embodiment where pH change is used in the converting step, the first encapsulating agent is a polymer having pendant functional groups derived from carboxylic acid anhydride functional groups, for example, an ammonium salt of a carboxamic acid. In this embodiment, derivatives of copolymers of styrene and maleic anhydride are particularly useful.

In another particular embodiment where converting involves forming the precipitated polymer, the first encapsulating agent is a water-dispersible polyisocyanate or a polymerizable oligomer of a suitable resin such as the oligomers that result from partial condensation of formaldehyde with, for example, phenol, urea, or melamine.

The encapsulated particles are, optionally, further treated with heat alone or heat in combination with a curing agent, of which calcium lignosulphate is but one example. In some embodiments, the encapsulated particles are subjected to a second encapsulation procedure in which the encapsulating agent is the same as or different from the encapsulating agent used in the first encapsulation. When two encapsulation procedures are carried out, the conversion in the second procedure is advantageously effected by forming the encapsulating polymer from the encapsulating agent.

DEFINITIONS

Aqueous solvent: is water or a mixture of water and an organic solvent that is freely miscible with water. Ethanol is but one example of an organic solvent that can be mixed with water to form an aqueous solvent. Preferably, water comprises at least about 50% v/v, more preferably about 95% v/v, of the aqueous solvent.

Average particle size shall mean that at least about 50% of the particles shall have a diameter within ±5% of the diameter cited, where diameter is measured by light scattering using an instrument, such as a Laser Scattering Particle Size Distribution Analyser, Horiba Instrument Corp., Irvine, Calif.

Bioactive agent: is a substance such as a chemical that can act on a cell, virus, organ or organism, including but not limited to drugs (i.e. pharmaceuticals) and pesticides, to create a change in the functioning of the cell, virus, organ or organism. In one embodiment of the invention, the method of the invention is applied to bioactive agents that are organic molecules having molecular weight of about 500 or less or to polymeric species such as proteins, nucleic acids, and the like. A "pesticide" is a molecule or combination of molecules that repels, retards, or kills pests, such as, but not limited to, deleterious or annoying insects, weeds, worms, fungi, bacteria, and the like, and can be used for crop protection, edifice protection, turf protection, or protection of a person; pesticide as used herein also refers to growth regulators, either used to encourage growth of a desired plant species or retard growth of an undesired pest.

Chemical agent: is an organic or inorganic compound, such as a compound to be used as a reactant in a synthetic or preparative process, as a reagent in an analytical method, a dye, a bioactive agent, and the like.

Encapsulating effective amount: is an amount of encapsulating agent which, used in a method of the present invention, is sufficient to form a coating on or admixture with at least 90% of the particles of chemical agent, where the coating or admixture is a functional amount.

Encapsulating agent: is a monomeric, oligomeric, or polymeric substance soluble or dispersible in an aqueous solvent under at least one set of conditions and which can be converted to an insoluble form by appropriate changes in process conditions or chemical form. Upon such conversion, an encapsulating agent forms a coating on or intimate solid admixture with particles dispersed or suspended in the aqueous solvent in which the encapsulating agent is dissolved.

Functional amount: is an amount of an encapsulant which, for example, slows release of the encapsulated agent, reduces the toxicity of the agent to mammals, stabilizes the form of the agent, inhibits crystallization of the agent, reduces the volatility of the agent, or produces any other benefit of coating a chemical agent with a polymer or admixing the chemical agent with the polymer.

Microparticles: are particles of chemical agent having average diameter from about 1 μm to about 1000 μm.

Significant increase in viscosity: an increase of about 50% or more in the Brookfield viscosity, as measured by a Brookfield viscometer, Brookfield Engineering Labs Inc., Stoughton, Mass., is considered significant. In general, an increase in Brookfield viscosity of between about 100 cp and about 200 cp is considered significant.

DETAILED DESCRIPTION OF THE INVENTION

The encapsulation method of the present invention is carried-out according to one of several possible embodiments. The encapsulation process, in any embodiment, can include adding one or more additives, such as xanthan gum; a bactericide, for example 1,2-benzisothiazolin-3-one (available from ICI Americas Inc., Talleyville, Del.); an amphoteric surfactant, for example laurimionodipropionate (available from Rhone-Poulenc Inc., Louisville, Ky. as Proxel® GXL); an inert dye, for example Tricon Green 18800 (available from Tricol Colors, Elmwood Park, N.J.); or an ionic dispersing agent such as an alkyl naphthalene sulfonate.

In a particularly preferred embodiment, the particles of chemical agent are microparticles that are dispersed throughout and remain suspended in an aqueous solvent and the process is carried-out in a high speed mill, such as an intermittent-type attritor mill, in which the first encapsulating agent also functions as a wetting agent.

A typical recipe according to the present invention will ordinarily contain from about 5 to about 60, preferably about 20 to about 50, weight percent of chemical agent, from about 1 to about 20, preferably about 5 to about 10, weight percent of a first encapsulating agent relative to the weight percent of the chemical agent to be encapsulated, and if any is used, about 0.05 to about 1, preferably about 0.1 to about 0.9, weight percent of a antifoam agent. Antifoam agents, if any are used, may include but are not limited to polydimethyl siloxanes.

The present invention is useful for, among other things, encapsulating chemical agents that are solid pesticides. The term pesticide includes but is not limited to herbicides, insecticides, acaricides, fungicides, nematicides, ectoparasiticides, and growth regulators. Solid pesticides that can be microencapsulated by the present invention include, but are not limited to, carbamates, ureas, triazines, triazoles, uracils, organophosphates, morpholines, dinitroanilines, acylalaninies, pyrethroids, and organochlorines. Examples of solid pesticides that can be use in the present invention include but are not limited to carbofuran, azinphos-methyl, sulfentrazone, carfentrazone-ethyl, cypermethrin, cyromazine, beta-cyfluthrin, endosulfan, and phosmet. When the solid pesticide is a herbicide, the formulations of the present invention control the release of the herbicide causing the herbicide to be released at a lower rate.

The encapsulating polymers or resins used as encapsulating agents in the present invention should preferably possess wetting agent characteristics and, in one embodiment, be pH sensitive so that when the pH is acidic they become water-insoluble and precipitate on the hydrophobic surface of the particles, but when the pH is basic the polymer is soluble in aqueous solvent. By possessing wetting agent characteristics and being pH sensitive, the encapsulating agent serves as both a wetting agent and a coating material. Activity as a wetting agent is evidenced by the stability over time of the particle size and viscosity of a suspension of particles of the chemical agent in an aqueous solvent in which an encapsulation effective amount of the encapsulating agent is dissolved and converted to a form that can be expected to encapsulate the particles. This indication of wetting agent character is particularly meaningful when a curing agent is present that can be expected to crosslink the encapsulating agent. However, wetting agent characteristics are also important when no curing agent is used.

Polymers or resins useful as first encapsulating agents in one embodiment of the present invention where the converting step involves pH change include polyanhydrides, in particular copolymers of maleic anhydride, as well as the acids, salts, and esters derived therefrom. The copolymer of methyl vinyl ether and maleic anhydride available from ISP, Wayne N.J. under the trademark Agrimer® VEMA is another example of a commercially available polyanhydride. Polymers formed from simultaneous or sequential hydrolysis and neutralization of styrene maleic anhydride copolymers (for example styrene maleic anhydride copolymer disodium salt, styrene maleic anhydride copolymer amide ammonium salt, and styrene maleic anhydride copolymer ammonium salt exemplify polymers derived from maleic anhydride copolymers). A particularly preferred encapsulating agent in this regard is the ammonium salt of the carboxamic acid derived from a styrene-maleic anhydride copolymer (i.e. styrene maleic anhydride copolymer amide ammonium salt) available from Solutia, Springfield Mass., as Scripset® 720. Still other polymers useful as encapsulating agents when the converting step involves pH change include polysaccharides; acrylic polymers, including polymers of acrylic acid or acrylamide; hydrophobically-modified polyacrylic acids; and phosphate esters, their acids and sodium salts; N-methylolacrylamide; and (vinyl chloride/vinyl acetate/hydroxyl acrylate) copolymer.

In one embodiment, encapsulation is effected by changing pH. For example, in certain embodiments using polymers that incorporate carboxylate groups, the pH of the aqueous particle suspension can be adjusted downward to a pH of from about 4 to about 7, preferably about 6. After adjusting the pH by the addition of the acid and, optionally, a first curing agent, the dispersion is optionally cured by heating to a temperature in the range of, for example, about 40° to about 90° C., preferably about 50° to about 80° C., for, for example, about 10 minutes to about five hours, preferably about 10 minutes to about two hours.

Wet-milling, when employed, typically uses high-shear milling. The time that the aqueous microparticle dispersion is wet-milled is not critical, but is usually about 15 to about 50 minutes. Factors that influence the particles size, which determines the eventual size of the microcapsules, and the stability of the suspension, include the speed and length of milling, the type and amount of encapsulating agent, temperature, and viscosity, as well as the presence of xanthan gum and alkyl naphthalene sulfonate dispersing agent, when these are used. Selection of the appropriate microcapsule size to achieve the purposes of the invention requires a balance between competing factors. In general, decreasing the amount of the first encapsulating agent gives smaller particle size and, when decreased beyond a certain amount, the particle size will increase and the coating of the microcapsule may not be as uniform. Increasing the amount of the first encapsulating agent can yield better coating uniformity but, beyond a certain amount, can yield larger particle size due to agglomeration. In preferred embodiments of the invention, these parameters are selected to give a functional amount of encapsulation while minimizing the amount of agglomeration occurring in the encapsulation process.

In one embodiment of the present invention, the average size of the microcapsules is about 1 $\mu$m to about 100 $\mu$m, preferably about 1 $\mu$m to about 30 $\mu$m. The operating conditions to yield microcapsules of a desired size will depend on a variety of factors, including, where applicable, the size of the starting particles, the wet-milling equipment used, the amount of encapsulating agent and curing agent used, the number of coating steps applied, and the like. For example, a smaller particle size generally results when less encapsulating agent is used and longer wet-milling time is used. In light of the present specification, adjustment to determine the proper conditions to achieve encapsulations within the scope of the present invention is well within the skill of the art.

The amount of acid added, when used, can, for example in certain embodiments, range from about 0.05 to about 5.0, preferably about 0.1 to about 3.0, weight percent relative to the total weight of the formulation, although this range can vary with the type of encapsulating agent used and the type of acid used. In general, the weight of acid added is sufficient to bring the pH of the aqueous solvent to between about 4 and about 6. Acids that may be useful in certain embodiments of the present invention are either protic acids or Lewis acids. Examples of protic acids or Lewis acids that may be used include but are not limited to hydrochloric acid, hydrobromic acid, hydroiodic acid, sulfuric acid, acetic acid, perchloric acid, trifluoroacetic acid, and 2,2,2-trifluoroethanol. A preferred acid is acetic acid.

By way of example, first curing agents that may be used in accordance with certain embodiments of the present invention are the divalent salts, of lignosulfonates, alkylbenzene sulfonates, and stearates. Also useful as first curing agents are diamines, silanes (e.g. vinyltriisopropoxysilane), aldehydes, polyhydroxides, epoxides, and water soluble amino resins. Further examples of suitable divalent salts, include but are not limited to calcium chloride, calcium carbonate, magnesium chloride, calcium lignosulfonate, calcium alkylbenzene sulfonate, and calcium stearate. An example of a suitable diamine is 2-methylpentamethylene diamine (available from DuPont, Willmington, Del., as Dytek® A). An example of a suitable water soluble amino resin is Cymel® 1141, available from Cytec, W. Paterson N.J. A preferred and first curing agent is calcium lignosulfonate. When one is used, the amount of the first curing agent added typically ranges from about 0.5 to about 10, preferably about 1 to about 5, weight percent present relative to the total weight of the formulation. The amount of first curing agent used varies with the type of curing agent used. For example, when calcium lignosulfonate is the first curing agent, relatively more first curing agent is used compared to the case where calcium chloride is the first curing agent.

In certain embodiments where the converting step comprises forming the encapsulating polymer, the encapsulating agents are water dispersible oligo- or polyisocyanates or water soluble or dispersible resins such as. formaldehyde copolymers, polyacrylamides, and phenoxy resins. Examples of formaldehyde copolymers, polyacrylamides, and phenoxy resins that may be used in the present invention are urea-formaldehyde resins, melamine-formaldehyde resins, phenol-formaldehyde resins, resorcinol-formaldehyde, butylated urea/formaldehyde, glycoluril-formaldehyde resins, and methylolacrylamide. Preferred among these encapsulating agents are melamine-formaldehyde resins, polymethylolacrylamide, and, in particular, water-dispersible polyisocyanates. Particularly preferred water-dispersible polymeric or oligomeric isocyanates are those based on an alkylene diisocynate in which the alkylene group can optionally comprise a ring structure. A particularly preferred water dispersible oligomeric or polymeric diisocyanate comprises residues of hexamethylene diisocyanate (e.g. Bayhydur XP-7063; Bayer Corporation, Pittsburgh, Pa.).

In certain preferred embodiments, these encapsulating polymers are used in a second encapsulation step, and so the encapsulating agents that form the polymers are "second encapsulating agents." When used in a second encapsulation step, the amount of the encapsulating agent added, if any is used, typically ranges from about 0.5 to 10, preferably about 1 to about 5, weight percent relative to the total weight of the encapsulated material.

Where the encapsulating agents of the above paragraph are used in a second encapsulation step, preferably the encapsulating agent is added more gently than is preferred in some embodiments of the first encapsulation. For example, stirring can be used. Stirring is preferably continued while the encapsulating agent is cured by heating to a temperature of about 40° to about 80° C., preferably about 70° C., for, for example, 10 minutes to ten hours, preferably one to four hours.

The amounts of post encapsulation additives to be added are similar for all embodiments and typically would be selected from one or more of about 0.003 to about 0.5, preferably about 0.005 to about 0.3, weight percent of xanthan gum; about 0.01 to about 0.1, preferably about 0.01 to about 0.08, weight percent of one or more bactericides; up to about 0.05, preferably up to about 0.04, weight percent of an inert dye; and up to about 7 weight percent of one or more surfactants, each weight percent relative to the weight of the formulation after addition of the additives.

In certain embodiments, the suspension of chemical agent in aqueous solvent, with or without curing agent, is filtered to remove particles having an average particle size greater than a selected amount, such as about 100 $\mu$m. The filtering step, for example, can be used to ensure that at least 90% of the microencapsulated particles have a particle size not greater that about 30 $\mu$m.

The formulations of the present invention are prepared in accordance with the procedures shown in the examples below. The examples serve only to illustrate the invention and should not be interpreted as limiting since further modifications of the disclosed invention will be apparent to those skilled in the art. All such modifications are deemed to be within the scope of the invention as defined in the claims.

EXAMPLES 1

Preparation of a 250 Grams/Liter Carbofuran Capsule Suspension (250 CS) Formulation A mixture of 20.0 grams of a 25% aqueous styrene maleic anhydride copolymer amide ammonium salt solution (Scripset® 720), Solutia, Springfield, Mass., 100.0 grams of carbofuran (FMC Corporation, Chicago, Ill.), 0.5 gram of a 100% polydimethyl siloxane antifoam agent (Dow Corning® 1520, Dow Corning Corporation, Midland, Mich.), and 90.0 grams of distilled water was wet-milled for 30 minutes at high speed in an intermittent-type attritor mill (Union Process Type B Attritor Mill, Union Process, Inc., Akron, Ohio). After this time, the aqueous microparticle dispersion was filtered into a one liter stainless steel beaker. To the filtrate was added 4.0 grams of calcium chloride and 65.0 grams of water. The pH of the mixture was adjusted to 5.7 by adding 0.8 gram (20 drops) of acetic acid. The suspension was then heated to 50° C. where it was stirred at about 200 to 350 rpm for one hour using an overhead paddle-type stirrer. After this time, 10.0 grams of a partially methylated melamine-formaldehyde resin (Cymel® 385, Cytec Industries Inc., West Paterson, N.J.) were added. Upon completion of addition, the formulation was heated to 70° C. where it stirred for one hour. At the conclusion of this period, 20.0 grams of aqueous 1% xanthan gum (Kelzan® S, Monsanto, St. Louis, Mo. and 10.0 grams of an nonionic polymeric surfactant (Atlox® 4913, ICI Americas Inc., Wilmington, Del., a subsidiary of Imperial Chemical Industries Surfacants) were added to the formulation. The formulation after mixing for thirty minutes had a viscosity of 336 cps.

EXAMPLE 2

Preparation of a 250 Grams/Liter Carbofuran Capsule Suspension (250 CS) Formulation A mixture of 20.0 grams of a 25% aqueous styrene maleic anhydride copolymer amide ammonium salt solution (Scripset® 720), 100.0 grams of carbofuran, 1.0 gram of a 100% polydimethyl siloxane antifoam agent (Dow Corning® 1520), and 90.0 grams of distilled water was wet-milled for 30 minutes at high speed in an intermittent-type attritor mill (Union Process Type B Attritor Mill, Union Process Inc., Akron, Ohio). After this time, the aqueous microparticle dispersion was filtered into a one liter stainless steel beaker. The pH of the filtrate (the dispersion) was adjusted to 5.4 by adding a pre-blended solution of 8.0 grams of a calcium lignosulfonate (Norlig® 11 DA, Ligno-Tech USA, Rothschild, Wis.) 0.8 gram (20 drops) of acetic acid, and 65.0 grams of distilled water. The suspension was heated to 70° C. where it was agitated for about one hour using an overhead paddle-type stirrer. After this time, 6.0 grams of N-methylolacrylamide (Cylink® NMA-LF, Cytec Industries Inc., West Paterson, N.J.) were added. Upon completion of addition, the formulation was heated to 70° C. where it stirred for one hour. At the conclusion of this period, 10.0 grams of aqueous 1% xanthan gum (Kelzano ® S) and 10.0 grams of an nonionic polymeric surfactant (Atlox® 4913) were added to the formulation. The formulation after mixing for ten minutes had a viscosity of 82 cps.

EXAMPLE 3

Preparation of a 250 Grams/Liter Carbofuran Capsule Suspension (250 CS) Formulation A mixture of 30.0 grams of a 25% aqueous styrene maleic anhydride copolymer amide ammonium salt solution (Scripset® 720), 100 grams of carbofuran, 1.0 gram of a 100% polydimethyl siloxane antifoam agent (Dow Corning® 1520), and 90.0 grams of distilled water was wet-milled for 25 minutes at high speed in an intermittent type attritor mill (Union Process Type B Attritor Mill, Union Process, Inc., Akron Ohio). After this time, the aqueous microparticle dispersion was filtered into a one liter stainless steel beaker. The pH of the filtrate (the dispersion) was adjusted to 5.6 by adding a pre-blended solution of 8.0 grams of a calcium lignosulfonate (Norlig® 11 DA), 1.2 grams (30 drops) of acetic acid, and 65.0 grams of distilled water. The suspension was heated to 70° C. where it was agitated at about 200 to 350 rpm for about two hours using an overhead paddle-type stirrer. After this time, 10.0 grams of aqueous 1% xanthan gum (Kelzan® S) and 10.0 grams of an nonionic polymeric surfactant (Atlox® 4913) were added to the formulation. The formulation was agitated for about ten additional minutes.

EXAMPLE 4

Preparation of a 250 Grams/Liter Carbofuran Capsule Suspension (250 CS) Formulation A mixture of 40.0 grams of an aqueous 25% styrene maleic anhydride copolymer amide ammonium salt solution (Scripset® 720), 96.0 grams of carbofuran, 1.0 gram of a 100% polydimethyl siloxane antifoam agent (Dow Corning® 1520), and 90.0 grams of distilled water was wet-milled for 20 minutes at high speed in an intermittent-type attritor mill (Union Process Type B Attritor Mill, Union Process Inc., Akron Ohio). After this time, the aqueous microparticle dispersion was filtered into a one liter stainless steel beaker. The pH of the filtrate (the dispersion) was adjusted to 5.9 by adding a pre-blended solution of 8.0 grams of a calcium lignosulfonate (Norlig® 11 DA), 2.0 grams (50 drops) of acetic acid, and 65.0 grams of distilled water. The suspension was agitated at about 25° C. for one hour and about 200–350 rpm using an overhead paddle-type stirrer type stirrer and then 10.0 grams of water-dispersible polyisocyanate (Bayhydur® XP-7063, Bayer Corp., Pittsburgh, Pa.) were added. Upon completion of addition, the formulation was heated to 60° C. where it was agitated for about 1.5 hours. At the conclusion of this period, about 40.0 grams of aqueous 1% xanthan gum (Kelzan® S) and a total of 25.0 grams of lignosulfonate sodium salt (15.0 grams of Lignosol® SFX-65L and 10.0 grams of Marasperse® B-22, both available from LignoTech USA, Rothschild, Wis.) were added to the formulation. The formulation after mixing for ten minutes had a Brookfield viscosity of 208 cps.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A composition comprising a suspension of particles of a chemical agent in an aqueous solvent wherein the particles are encapsulating agent selected from the group consisting of polyanhydrides, and acids, salts, and esters thereof; polysaccharides; polymers of acrylic acids; copolymers of acrylic acid; polymers of acrylamide; copolymers of acrylamide; acrylic polymers and copolymers; hydrophobically-modified polyacrylic acids; polymers formed from simultaneous or sequential hydrolysis and neutralization of styrene maleic anhydride copolymers; the ammonium salt of the amic acid derived from styrene maleic anhydride copolymer; poly(methyl vinyl ether-co-maleic anhydride; N-methylacrylamide; (vinyl chloride/vinyl acetate/hydroxyl acrylate) copolymer; and polyisocyanates; and the encapsulated particles are coated with a second encapsulating agent selected from the group consisting of a formaldehyde copolymer, a polyacrylamide, and a phenoxy resins.

2. The composition of claim 1, wherein the encapsulating agent is selected from the group consisting of a urea-formaldehyde resin, a melamine-formaldehyde resin, a phenol-formaldehyde resin, resorcinol-formaldehyde, butylated urea/formaldehyde, a glycoluril-formaldehyde resin, and methylolacrylamide.

3. A composition comprising a suspension of particles of a solid pesticide in an aqueous solvent wherein the particles are encapsulated in a first encapsulating agent; the first encapsulating agent is an ammonium salt of a polymeric amic acid; the polymeric amic acid is derived from a styrene-maleic anhydride copolymer; the encapsulation of the particles has been effected by changing the pH of the aqueous solvent to a about 6 to precipitate the ammonium salt of the polymeric amic acid; and the encapsulated particles are coated with a second encapsulating agent selected from the group consisting of a formaldehyde copolymer, a polyacrylamide, and a phenoxy resins.

4. A composition comprising a suspension of particles of a solid pesticide in an aqueous solvent wherein the particles are encapsulated in a first encapsulating agent; the first encapsulating agent is an ammonium salt of a polymeric amic acid; the polymeric amic acid is derived from a styrene-maleic anhydride copolymer; the encapsulation of the particles has been effected by changing the pH of the aqueous solvent to a about 6 to precipitate the ammonium salt of the polymeric amic acid; and the encapsulated particles are coated with a second encapsulating agent selected from the group consisting of a urea-formaldehyde resin, a melamine-formaldehyde resin, a phenol-formaldehyde resin, resorcinol-formaldehyde, butylated urea/formaldehyde, a glycoluril-formaldehyde resin, and methylolacrylamide.

* * * * *

UNITED STATES PATENT AND TRADEMARK OFFICE
CERTIFICATE OF CORRECTION

PATENT NO. : 6,387,385 B1
DATED : May 14, 2002
INVENTOR(S) : Wenhau W. Wang

It is certified that error appears in the above-identified patent and that said Letters Patent is hereby corrected as shown below:

Title page,
Item [54], Title, before "PROCESS" insert the word -- NOVEL --

Column 3,
Line 42 to line 43, after "Ky." delete the phrase "as Proxel®GXL --

Column 4,
Line 49, after ")" and before "available" insert the words -- Proxel®GXL --

Column 8,
Line 62, after "are" insert the words -- encapsulated in a first --

Column 9,
Line 10, after "the" and before "encapsulating" insert the word -- second --

Column 10,
Line 1, after "a" insert the words -- value of --

Signed and Sealed this

Twenty-fourth Day of December, 2002

JAMES E. ROGAN
*Director of the United States Patent and Trademark Office*